United States Patent
Vogel et al.

[11] Patent Number: 6,043,580
[45] Date of Patent: Mar. 28, 2000

[54] ROTODYNAMIC MACHINE FOR THE FORWARDING OF A FLUID

[75] Inventors: Andreas Vogel, Schinznach Dorf; Joachim Schmied, Oberehrendingen, both of Switzerland

[73] Assignees: Sulzer Turbo AG, Zurich; Sulzer Pumpen AG, Winterthur, both of Switzerland

[21] Appl. No.: 09/051,259
[22] PCT Filed: Oct. 4, 1996
[86] PCT No.: PCT/CH96/00350
  § 371 Date: Apr. 3, 1998
  § 102(e) Date: Apr. 3, 1998
[87] PCT Pub. No.: WO97/13986
  PCT Pub. Date: Apr. 17, 1997

[30] Foreign Application Priority Data
  Oct. 6, 1995 [CH] Switzerland .............. 02834/95

[51] Int. Cl.⁷ .................................... H02K 1/00
[52] U.S. Cl. .............. 310/179; 318/722; 417/423.7
[58] Field of Search ............... 310/179, 90.5, 310/114, 181, 168; 417/423.7, 356, 423.1; 318/720, 722

[56] References Cited

U.S. PATENT DOCUMENTS

| | | | |
|---|---|---|---|
| 3,224,818 | 12/1965 | Sixsmith | 310/90.5 |
| 3,694,041 | 9/1972 | Studer | 310/90.5 |
| 3,769,555 | 10/1973 | Dolbachian et al. | 318/138 |
| 4,057,369 | 11/1977 | Isenberg et al. | 417/365 |
| 5,112,202 | 5/1992 | Oshima et al. | 417/423.7 |
| 5,237,229 | 8/1993 | Ohishi | 310/90.5 |
| 5,424,595 | 6/1995 | Preston | 310/90.5 |
| 5,578,880 | 11/1996 | Lyons et al. | 310/90.5 |

FOREIGN PATENT DOCUMENTS

| | | |
|---|---|---|
| 871.024 | 4/1979 | Belgium . |
| 0 299 855 A1 | 1/1989 | European Pat. Off. . |
| 9017166 U | 5/1991 | Germany . |
| 4102707A1 | 8/1991 | Germany . |
| 9112183 U | 3/1992 | Germany . |
| WO 95/20260 | 7/1995 | WIPO . |

*Primary Examiner*—Nestor Ramirez
*Assistant Examiner*—Joseph Waks
*Attorney, Agent, or Firm*—Townsend and Townsend and Crew LLP

[57] ABSTRACT

A rotordynamic machine for the forwarding of a fluid, such as a turbomachine (2) or a centrifugal pump, has at least one drive and bearing apparatus (1) which is designed as an electrical machine with a stator and with a magnetically journalled rotor (4a). Electrical windings (15, 16) produce the required torque and the magnetic bearing force and are arranged together in the stator. The rotor (4a) forms a section of the shaft (4) of the turbomachine (2) and a control apparatus (7) and excites the two windings (15, 16). A magnetic suspension force acting on the rotor (4a) is produced with the first winding (16) in order to hold the shaft (4) in the radial direction without contact. The torque acting on the rotor (4a) is produced with the second winding (15).

9 Claims, 3 Drawing Sheets

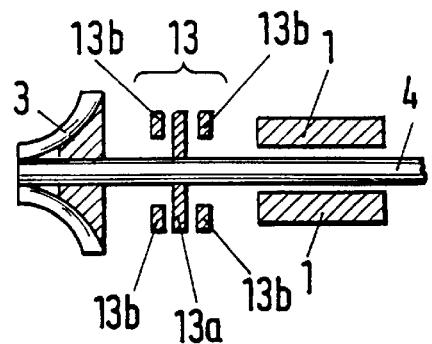
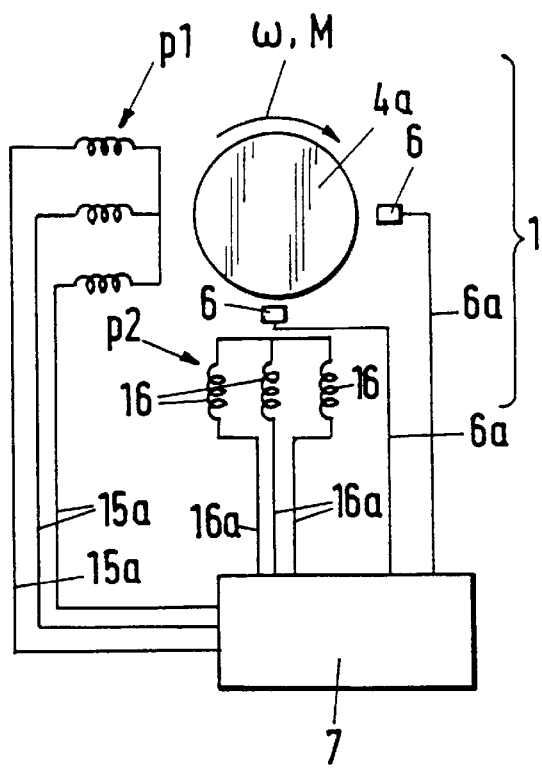
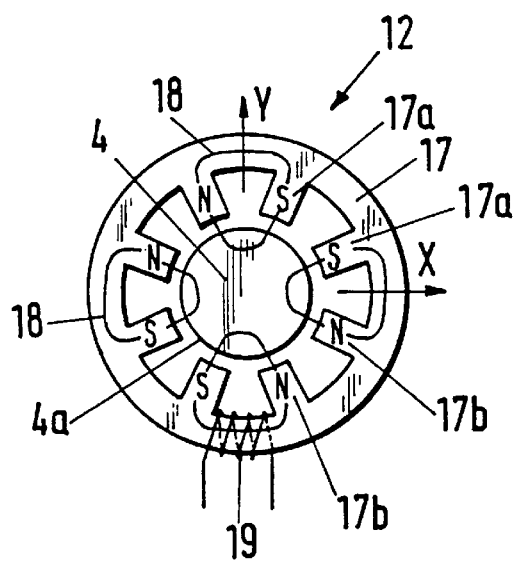

ROTODYNAMIC MACHINE FOR THE FORWARDING OF A FLUID

BACKGROUND OF THE INVENTION

The invention relates to a rotodynamic machine for the forwarding of a fluid, for example to a turbomachine or a centrifugal pump.

It is known to hold the shaft of a rotodynamic machine for the forwarding of a fluid, such as a turbomachine, in particular a turbo-compressor, in the radial direction using two magnetic bearings arranged in the region of the shaft end. Magnetic bearings have a limited specific bearing capacity which is lower than for conventional bearings. For reasons of space these magnetic bearings are designed to be very narrow in the longitudinal direction of the shaft in turbomachines and therefore possess a low journalling force.

SUMMARY OF THE INVENTION

It is an object of the present invention to journal and to drive the rotor of a rotodynamic machine in a technically and economically more advantageous manner.

The rotodynamic machine in accordance with the invention for the forwarding of a fluid, in particular a turbomachine or a centrifugal pump, comprises a journalled shaft with a rotor and a drive and bearing apparatus, with the drive and bearing apparatus comprising a stator with electrical windings surrounding the shaft, and with the mutual design of the rotor, the stator and the electrical windings and the excitation of the electrical windings by a control device being such that these form a bearing-free motor in order to both journal the shaft without contact and to produce a torque on the shaft through magnetically acting forces. The shaft and the rotor are preferably designed as a unit in such a manner that the rotor forms a part of the shaft, with the rotor being understood in the present specification to mean the rotatable part of the drive and bearing apparatus. The rotor cooperates with the stator in such a manner that the rotor is held in the stator without contact and at the same time can be driven by the stator. Since the rotor is connected firmly to the shaft or is a part of the shaft, the shaft is held and driven by the stator without contact.

A bearing-free motor is understood to mean an electrically excitable drive and bearing apparatus which comprises both a rotor and a stator having electromagnetic coils. The rotor, or the armature, of the bearing-free motor can be driven in accordance with the principles of electric machines in a manner which is known per se, that is, in accordance with the principles of a synchronous motor, of a reluctance motor or of an induction motor or an asynchronous motor respectively. The rotor of the bearing-free motor is held without contact by magnetically acting forces at least in one plane extending perpendicular to the axis of rotation. The electromagnetic coils can be excited in such a manner that the position of the rotor can be actively influenced in a plane extending perpendicular to the axis of rotation of the rotor. The position of the rotor is monitored by sensors and the electromagnetic coils are regulatably excited with a correspondingly designed excitation apparatus in such a manner that the rotor is held without contact in the stator with respect to the plane extending perpendicular to the axis of rotation of the rotor. In addition a torque can be produced on the rotor or the armature via a corresponding excitation of the electromagnetic coils of the stator so that the rotor experiences a rotation about its axial axis. The rotor of a so-called bearing-free motor of this kind is thus to be actively excited with respect to three degrees of freedom, namely the position in the x and y directions and the rotation about its axis. A bearing-free motor having these properties can be designed in accordance with different constructional forms.

A bearing-free motor can for example be designed as a reluctance motor in that the rotor, for example, is designed in the shape of a cross and the stator is formed of a plurality of coils which extend in the radial direction, are arranged in the peripheral direction about the rotor, and can be individually electrically excited. These coils can be excited in such a manner that the rotor and thereby the entire shaft is held in suspension with respect to a plane extending perpendicular to the axis of rotation and that the rotor can be rotationally driven in addition about its axis of rotation in that a rotary magnetic field is produced by the coils.

A bearing-free motor can for example be designed similarly to a synchronous motor in that the rotor has a permanent magnet extending in the radial direction and the stator a rotary field winding, also called a drive winding, which drives the rotor rotationally about its axis of rotation. In addition the stator has a control winding in order to control the position of the rotor in a plane extending perpendicular to the axis of rotation, with the position of the rotor or the magnetic flux respectively being measured by sensors and the control winding being excited via an excitation apparatus in such a manner that the rotor is held without contact in the stator in the plane extending perpendicular to the axis of the stator. In one embodiment a so-called bearing-free motor designed in this manner has a drive winding with a number of pole pairs p and a control winding with a number of pole pairs p+1 or p−1.

The bearing-free motor can also be designed as an induction motor or an asynchronous motor, with the rotor for example being designed as a cage rotor with a short-circuited cage so that an induced current can be produced in the cage rotor through alternating magnetic fields.

The rotodynamic machine in accordance with the invention, such as a turbomachine or a centrifugal pump, comprises at least one drive and bearing apparatus which is designed as an electrical machine with a magnetically journalled rotor, with the windings producing the torque and the magnetic bearing force being arranged together in a stator, and with the rotor forming a part of the shaft of the turbomachine, and with a control apparatus which excites the two windings being provided in such a manner that a magnetically acting suspension force can be produced on the rotor with one winding in order to hold the shaft in the radial direction without contact and in that a torque acting on the rotor can be produced using the other winding.

This rotodynamic machine, such as a turbomachine or a centrifugal pump, has the advantage that the drive and bearing apparatus, which among other things produces the magnetic supporting force for the shaft, can be made relatively broad or long in the direction of extent of the shaft. This relatively broad and thus large bearing surface resulting therefrom both enables heavier static and dynamic loads to be borne as well as enabling dynamically varying load components to be compensated. Thanks to the large bearing surface, relatively large bearing forces can be produced so that the supporting force can be predetermined and/or changed corresponding to the state of the turbomachine or the centrifugal pump via a control apparatus which excites the drive and bearing apparatus.

An advantage of the invention is to be seen in that the shaft of the rotodynamic machine, such as a turbomachine or a centrifugal pump, can be held in the radial direction without contact using at least two drive and bearing apparatuses distributedly arranged along the shaft. In this situation two or also more compressor wheels or rotors or rotor wheels can be arranged adjacently on the shaft. A further advantage is to be seen in that it permits the drive and bearing apparatus to influence the dynamic behavior of the shaft, for which reason a plurality of compressor wheels and drive and bearing apparatuses can be arranged on a common shaft. A further advantage is to be seen in that the entire turbomachine can be integrated completely encapsulated in a housing, since the drive and bearing apparatus produces both the journalling of the shaft and the driving of the shaft. It is thus no longer necessary to allow the shaft to project out of the housing in order to be able to drive the shaft of the turbomachine or the centrifugal pump by a drive device arranged outside the housing.

BRIEF DESCRIPTION OF THE DRAWINGS

FIG. 5 shows an exemplary embodiment of an axial bearing;

FIG. 5a shows a further exemplary embodiment of an axial bearing;

FIG. 6 shows a schematic cross-section through a stator of a drive and bearing apparatus and a corresponding control apparatus; and FIG. 7 is a cross-section through a radial bearing.

DESCRIPTION OF THE PREFERRED EMBODIMENTS

Figure 1:
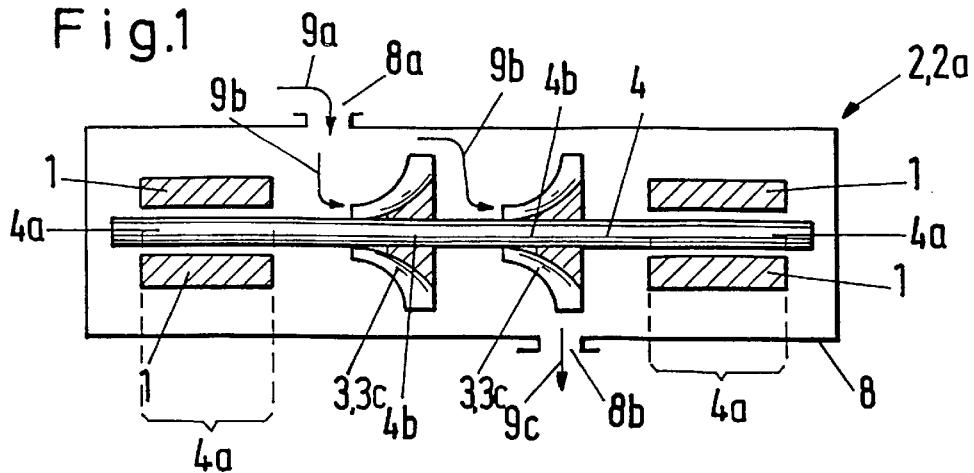
FIG. 1 shows a turbomachine or a centrifugal pump with two drive and bearing apparatuses.

FIG. 1 schematically shows a turbomachine 2 which, arranged encapsulated in a pressure resistant housing 8, has a common shaft 4 as well as two compressor stages and two drive and bearing apparatuses 1. The pressure resistant housing 8 is dimensioned in accordance with the internal pressure of the compressor stages. Of these compressor stages only the two compressor wheels 3, which are firmly connected to the shaft 4, are shown for the sake of clarity. The two drive and bearing apparatuses 1 are arranged in the region of the end of the shaft 4 and have the task of journalling the rotors 4a and thereby also the shaft 4 which is firmly connected to the rotors 4a in the radial direction without contact through magnetically acting forces and to drive the shaft 4. The drive and bearing apparatus 1 has a rotor 4a which forms a part of the shaft 4. The mass flow 9a to be compressed enters into the interior of the housing 8 via an inlet opening 8a, with the mass flow 9b flowing through the compressor wheels 3 and leaving the housing 8 via the outlet aperture 8b as an outgoing mass flow 9c.

Each drive and bearing apparatus 1 is designed as an electrical machine with a magnetically journalled rotor 4a, with two windings 15, 16 producing the torque and the magnetic bearing force being arranged in the stator of the drive and bearing apparatus. The rotor 4a forms a part of the shaft 4 of the turbomachine 2. The two windings 15, 16 are excited by a control apparatus 7 in such a manner that a magnetic suspension force can be produced on the rotor 4a with the one winding 16 in order to hold the shaft 4 in the radial direction without contact and that a torque acting on the rotor 4a can be produced on the rotor 4a with the other winding 15.

The drive and bearing apparatus 1 is designed in its operating principles as a synchronous or an asynchronous rotary field machine with rotary current windings arranged in the stator. As illustrated in FIG. 6, the stator winding consists of two galvanically separated rotary current windings 15, 16 with the numbers of pole pairs p1 and p2.

The numbers of pole pairs p1 and p2 of the two rotary current windings 15, 16 forming the stator winding differ by one. The two windings 15, 16 with different polarities can be arranged in the stator to lie radially one above the other or mutually interlocked, i.e. with coils which in the peripheral direction alternatingly belong to the one or the other winding. The torque required for the driving of the rotor 4b is produced by the winding 15 having the same number of pole pairs as the rotor 4b. In this the rotor 4b is designed as a cage rotor. No drive torque is produced by the rotary field of the other winding 16 since a corresponding number of pole pairs is not present in the rotor 4b. Through the cooperation of the two rotary fields of different polarities yet produced by the control apparatus 7 with the same frequency and circulating in the same sense, a spatially stationary, one-sided magnetic attraction force is produced on the rotor 4b in the air gap of the drive and bearing apparatus 1 which serves for its journalling. The magnitude and the direction of the magnetic bearing force can be set through a change in the magnitude and phase of the voltage exciting the windings 15, 16 in relation to one another.

The drive and bearing apparatus 1 can be designed as a synchronous machine, with the rotor 4b being formed as a permanent magnet rotor or reluctance rotor or as an electrically excited rotor. The drive and bearing apparatus 1 can also be designed as an asynchronous machine, with the rotor 4b having one or more short-circuited loops or coils or coil windings terminated by resistors, the number of pole pairs p1 of which corresponds to the number of pole pairs p1 of the winding 15. The winding can in particular be sinusoidally distributed on the rotor 4b. In FIG. 6, furthermore, two sensors 6 arranged in the drive and bearing apparatus 1 for the measurement of the position of the rotor 4a are illustrated. The sensors are connected to the control apparatus 7 via electrical conductors 6a. The rotor 4a rotates at an angular speed ω, or a torque M is produced on the rotor 4a by the winding 15.

Not illustrated in FIG. 1 is an axial bearing which compensates the forces which are produced in the axial direction by the compressor wheels 3 in order to hold the shaft 4 stationary in the axial direction. Likewise not illustrated is the usual compensation of the axial forces through a correspondingly dimensioned compensation piston. FIG. 5 shows an axial bearing 13 of this kind which is designed in the illustrated exemplary embodiment as an axial magnetic bearing 13 with a disc 13a, electromagnets 13b and sensors for the measurement of the axial position of the shaft 4. Various axial bearings can be used for the axial journalling of the shaft 4. In addition to a conventional axial magnetic bearing as described above, further axial bearings are suitable. The drive and bearing apparatus 1 has a certain axial bearing capacity at its disposal per se. Furthermore, the drive and bearing apparatus 1 can be designed with a conically extending rotor 4a and a correspondingly matched conically extending stator, which serves to produce axial forces pointing in the axial direction, the magnitudes and directions of which can be controlled via the windings 15, 16 in order thereby to compensate for the axial forces produced for example by the compressor wheels 3.

FIG. 1 shows schematically in addition an exemplary embodiment of a centrifugal pump 2a, with the shaft 4 bearing two rotors 3c arranged with spacing in the axial direction. The shaft 4 is, as already previously described in the exemplary embodiment of the turbomachine 2, held and driven without contact by the two drive and bearing apparatuses 1.

FIG. 5a shows a further, conventional axial bearing 13 for the compensation of the axial thrust acting on the shaft 4. The axial bearing 13 has an inner space 13c which can be stressed by a pressure p and a disc 13d which can be firmly connected to the shaft 4. A dry gas seal to the shaft 4 is arranged between the housing wall of the inner space 13c and the disc 13d. The axial position of the shaft 4 is measured by a sensor, and the pressure p of a fluid at the base of the axial bearing is regulated in such a manner that an axial thrust is produced on the shaft 4 in order to hold the shaft 4 in a predeterminable position. For a centrifugal pump 2a an axial bearing with the same technical effect, namely holding the shaft 4 in a predeterminable position, can be achieved in that a floating ring seal with a corresponding fluid is arranged instead of the dry gas seal. The dry gas seal is thus replaced by a so-called wet seal.

In the exemplary embodiment of FIG. 1 the rotors 3 are firmly connected to the shaft 4. The rotor 4a of the drive and bearing apparatus 1 and the shaft 4b of the compressor wheels 3 are firmly connected to one another to form a common shaft 4. The common shaft 4 can be mechanically separated in that the rotor 4a and the shaft 4b can be releasably connected to one another by mechanical means. The entire shaft 4 with the thereto fastened compressor wheels 3 is journalled without contact by the two drive and bearing apparatuses 1 arranged at the end region of the shaft 4. The torque produced on the shaft 4 is likewise produced by the drive and bearing apparatus 1. The drive and bearing apparatuses 1 can be excited in such a manner that the torque is produced either by only one or by both of the drive and bearing apparatuses 1, with it being possible in the case of two drive and bearing apparatuses 1 to divide the total torque between the individual drive and bearing apparatuses 1 in any ratio desired.

Figure 2:
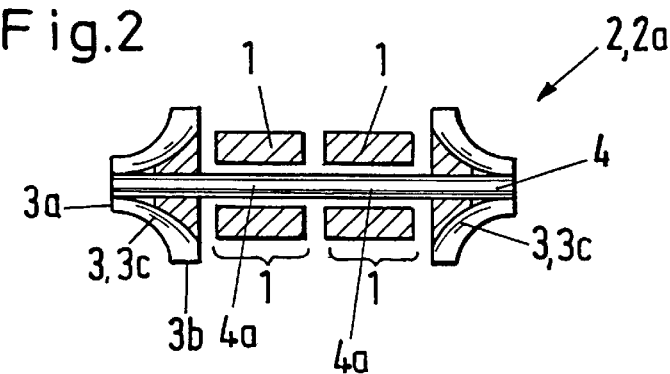
FIG. 2 shows a turbomachine or a centrifugal pump with two drive and bearing apparatuses and symmetrically arranged compression wheels or rotors, respectively.

FIG. 2 shows a further turbomachine 2 or a centrifugal pump 2a with two directly adjacently arranged drive and bearing apparatuses 1 having a common shaft 4 with a rotor 4a and compressor wheels 3 or rotors 3c arranged symmetrically at both ends which are driven by the drive and bearing apparatus 1 and are journalled without contact at least in the radial direction. The two compressor wheels 3 or rotors 3c are arranged on the shaft 4 directed opposite one another, which produces the advantage that the forces directed in the axial direction are at least approximately mutually compensated. The drive and bearing apparatus 1 can be designed and excitable in such a manner that it can produce a certain controllable axial force so that under certain conditions no additional axial bearing is required in the exemplary embodiment in accordance with FIG. 2. The compressor wheel 3 or the rotor 3c has an inlet side 3a and an outlet side 3b for the fluid to be forwarded.

Figure 3:
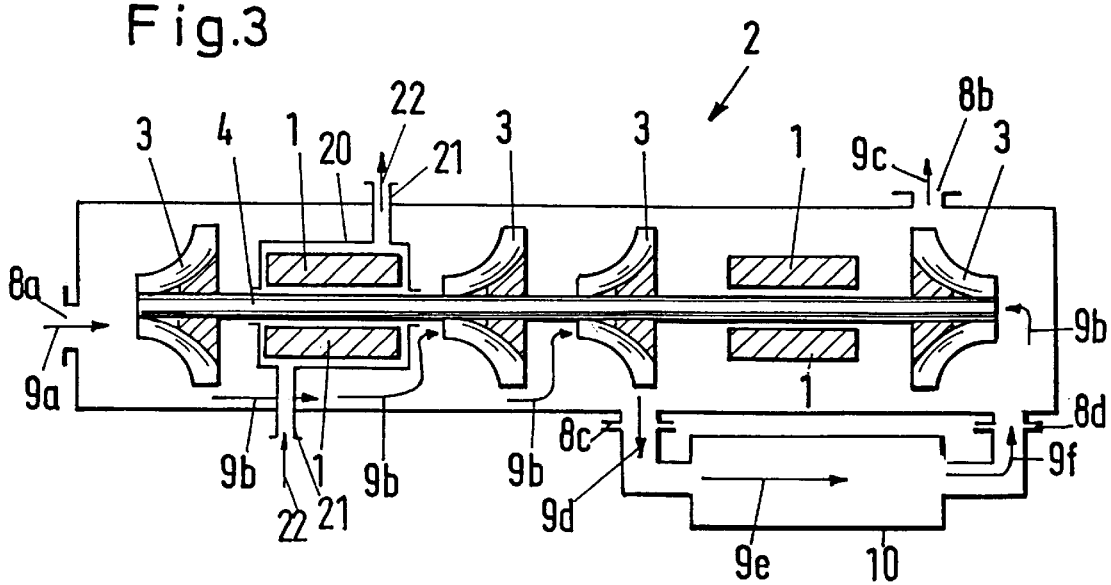
FIG. 3 shows a further turbomachine with a plurality of compressor wheels.

FIG. 3 shows a further exemplary embodiment of a turbomachine 2 with a shaft 4 and a plurality of drive apparatuses 1 and compressor wheels 3 arranged in series which all have a common shaft 4. The position of the shaft 4 is measured with sensors 6, and the windings 15, 16 of the drive and bearing apparatus 1 are excited by the control apparatus 7 in such a manner that the shaft 4 is held without contact by magnetically acting forces at least in the radial direction.

The rotodynamic behavior of the shaft 4 can be influenced via the windings 15, 16 during the operation of the turbomachine 2 in that the magnetically acting forces produced by the windings 15, 16 are varied. These forces can be influenced for example in the direction opposite to the gravitational force. The windings 15, 16 can also be excited in such a manner that the magnetically produced force vector assumes a radially extending direction which is predeterminable by the control apparatus 7 or that the orientation of the radially extending force vector is varied with time. In addition, the magnitude of the force vector can be varied. Since the position of the shaft 4 can be measured by sensors 6, the windings 15, 16 can be excited by a control apparatus 7 in such a manner that the rotodynamic behavior of the shaft 4 or of the turbomachine can be influenced.

The turbomachine 2 has a housing 8 which is designed in such a manner that all fixed and rotating parts are arranged encapsulated in the interior of the housing 8. The incoming mass flow 9a enters into the interior of the housing 8 through an inlet opening 8a, passes as a mass flow 9b through a plurality of compressor wheels 3, enters via an outlet opening 8c into a cooling apparatus 10, where the cooled mass flow 9e is conveyed via an inlet opening 8d again as an incoming mass flow 9f to a further compressor wheel 3, in order subsequently to leave the turbomachine 2 as a mass flow 9c via an outlet opening 8b. An intermediate cooling with a cooler 10 has the advantage that the volume of the mass flow can be reduced. An advantage of the embodiment in accordance with FIG. 3 is to be seen in that the housing 8 has no further openings except for the openings 8a, 8b, 8c, 8d. The named openings 8a, 8b, 8c, 8d can be completely tightly connected to further intake and outlet lines through correspondingly formed connecting pieces. A further advantage of the embodiment in accordance with FIGS. 1 to 3 is to be seen in that, due to the shaft 4 lying inside the housing 8, the housing 8, which is under pressure, can be closed off completely tightly, and that the turbomachine 2 can be operated without oil and in particular that the shaft 4 is journalled in an oil-free manner. It is however also possible to provide a cut-out in the housing 8 in order that the shaft 4 can be driven by an additional drive apparatus arranged outside the housing 8. For this, corresponding sealing apparatuses are required at the place where the shaft 4 passes through the housing 8. Dry gas seals are suitable above all for such seal apparatuses.

In the forwarding of corrosive media it can prove advantageous to encapsulate the drive and bearing apparatus 1 with an apparatus 20, 21 as shown in FIG. 3. This apparatus 20 is designed as a toroidal sleeve 20 with seals at the shaft 4 and with an inlet and outlet opening 21. Through this apparatus 20, 21 flows a liquid or a gas 22, e.g. nitrogen, in order to cool the drive and bearing apparatus 1 and in order to keep off the corrosive medium. The apparatus 20, 21 is flowed about on the outside by a corrosive medium 9b so that the drive and bearing apparatus 1 is arranged to be protected from this medium 9b.

Figure 4:
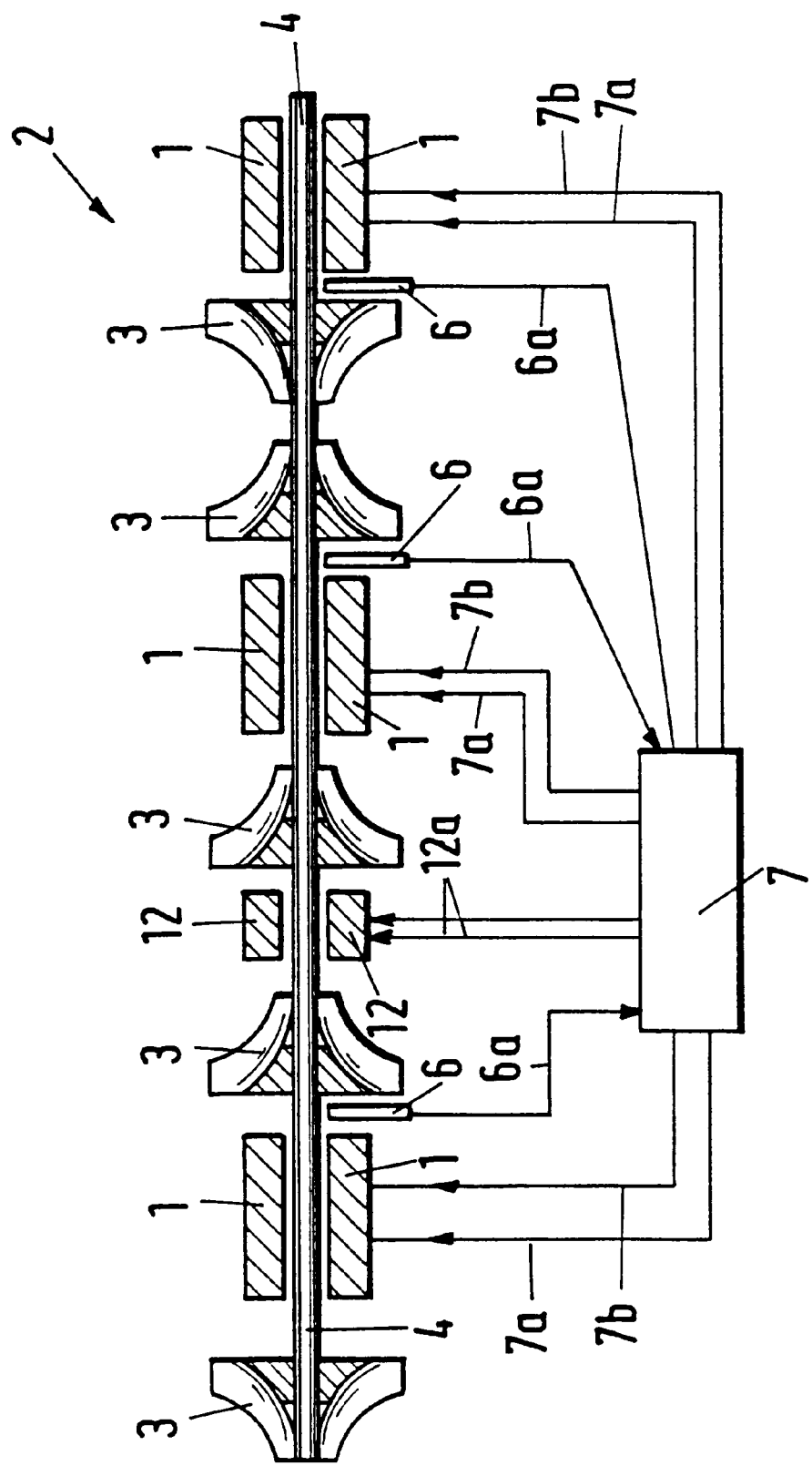
FIG. 4 shows a further turbomachine with a control apparatus.

FIG. 4 shows a further exemplary embodiment of a multistage process compressor with a common shaft 4 and a plurality of compressor wheels 3 as well as drive and bearing apparatuses 1. A control system with control apparatus 7 is illustrated in addition. The state of the turbomachine 2 is measured by the sensors 6. The sensors 6 can measure for example the position of the shaft 4 with respect to the stator of the drive apparatus 1 or the position of the shaft 4 in a compressor stage 3 and the angular speed of the shaft 4. The signals of the sensors 6 are fed via electrical lines 6a to a control apparatus 7. The drive and bearing apparatuses 1 are excited via electrical lines 7a, 7b in accordance with the data of the control apparatus 7. In the illustrated exemplary embodiment a magnetic radial bearing 12 is additionally provided with a winding 19 for the production of a suspension force acting on the shaft 4. The radial bearing 12 is connected to the control apparatus 7 via electrical lines 12a. The bending deflection and/or the dynamic behavior of the shaft 4 can be influenced in a broad range through a corresponding arrangement and excitation of the drive and bearing apparatuses 1 and of radial bearings 12 which are possibly provided. In an advantageous use, the drive and bearing apparatuses 1 and/or the magnetic radial bearings 12 are excited by the control apparatus 7 in such a manner that the rotodynamic behavior of the shaft 4 is influenced, in particular in such a manner that the internal oscillations of the rotor can be individually actively damped at different axial positions. The electric lines 7a, 7b, 12a and the electrical conductor 6a are led through the housing 8 through gas-tight passages, which are not illustrated in all the Figures, and are led to the control apparatus 7 outside the housing 8.

FIG. 7 shows a cross-section through an exemplary embodiment of a radial bearing 12 which has a laminated sheet metal packet 17 with magnetic poles 17a, 17b distributedly arranged in the peripheral direction. Furthermore, the shaft 4 and the magnetic flux 18 passing through the laminated sheet metal packet 17 and the shaft 4 are illustrated. By means of electrical windings 19 acting on the laminated sheet metal packet 17, of which only a single one is illustrated, a radially directed force acting on the shaft 4 can be produced through a corresponding excitation. This force can be used for the contact-free journalling of the shaft 4 or also for the compensation of forces dynamically acting on the shaft 4.

Thus for example one of the two drive and bearing apparatuses 1 can in each case be replaced by a radial bearing 12 in the exemplary embodiments in accordance with FIG. 1 or FIG. 2.

In the exemplary embodiment in accordance with FIG. 4 the common shaft 4 can also be subdivided, for example in such a manner that the shaft 4 is parted between the radial bearing 12 and the compressor wheel 3 arranged to the right of it, and that the turbomachine thus has two separate shafts 4. An advantage of two or more separate shafts 4 is to be seen in that the shafts 4 can be operated at different speeds of rotation.

What is claimed is:

1. Rotodynamic machine for the forwarding of a fluid comprising:

first and second radial bearings and a shaft, the radial bearings being spaced apart in a longitudinal direction of the shaft and supporting the shaft; one of a compressor wheel and an impeller arranged on the shaft between the radial bearings; an electrical machine with a stator for driving the shaft; at least one of the first and second radial bearings and the electrical machine being combined to define a drive and bearing apparatus forming a first bearing-free motor; the drive and bearing apparatus comprising a rotor, the stator and electrical windings surrounding the rotor, and the rotor comprising part of the shaft; the rotor, the stator and the electrical windings being mutually matched and arranged to define means magnetically journalling the shaft without contact and producing an electromagnetically induced torque on the shaft to thereby form the bearing-free motor; wherein the electrical windings comprise a first set of electrical windings for producing the torque having a number of pole pairs n, and a second set of electrical windings for producing a magnetic bearing force for magnetically journalling the shaft and having a different number of pole pairs n+1 or n−1.

2. Rotodynamic machine in accordance with claim 1 including a housing having an inlet opening and an outlet opening permitting the fluid to flow therethrough, and wherein the machine is integrated with and encapsulated by the housing.

3. Rotodynamic machine in accordance with claim 1 further comprising one of a plurality of compressor wheels or a plurality of impellers arranged on the shaft between the radial bearings.

4. Rotodynamic machine in accordance with claim 1 further comprising at least a second bearing-free motor arranged along the shaft at a location spaced apart from the first bearing-free motor.

5. Rotodynamic machine in accordance with claim 1 wherein the rotor comprises one of a reluctance rotor, a permanent magnet rotor and an electrically excited rotor.

6. Rotodynamic machine in accordance with claim 1 including a control device for driving the rotor of the bearing-free motor in accordance with the principle of operation of one of a reluctance motor, a synchronous motor and an induction motor.

7. Rotodynamic machine in accordance with claim 1 including an arrangement for axially guiding the shaft selected from the group comprising an electromagnetic axial bearing and an axial bearing having an active thrust compensation member.

8. Rotodynamic machine in accordance with claim 1 comprising a turbomachine.

9. Rotodynamic machine in accordance with claim 1 comprising a centrifugal pump.

\* \* \* \* \*